(12) United States Patent
Choi

(10) Patent No.: US 11,412,666 B2
(45) Date of Patent: Aug. 16, 2022

(54) ROTARY VEGETABLE CULTIVATION APPARATUS

(71) Applicant: Eun-Hee Choi, Yongin-si (KR)

(72) Inventor: Eun-Hee Choi, Yongin-si (KR)

( * ) Notice: Subject to any disclaimer, the term of this patent is extended or adjusted under 35 U.S.C. 154(b) by 171 days.

(21) Appl. No.: 17/045,822

(22) PCT Filed: Dec. 13, 2018

(86) PCT No.: PCT/KR2018/015842
§ 371 (c)(1),
(2) Date: Oct. 7, 2020

(87) PCT Pub. No.: WO2019/225826
PCT Pub. Date: Nov. 28, 2019

(65) Prior Publication Data
US 2021/0137024 A1    May 13, 2021

(30) Foreign Application Priority Data
May 21, 2018    (KR) ......................... 10-2018-0058026

(51) Int. Cl.
*A01G 7/04* (2006.01)
*A01G 9/02* (2018.01)
*A01G 31/04* (2006.01)

(52) U.S. Cl.
CPC .............. *A01G 7/045* (2013.01); *A01G 9/022* (2013.01); *A01G 31/04* (2013.01); *A01G 31/047* (2013.01)

(58) Field of Classification Search
CPC ....... A01G 31/04; A01G 31/047; A01G 9/022
See application file for complete search history.

(56) References Cited

U.S. PATENT DOCUMENTS

| 1,281,105 | A | * | 10/1918 | Unger | A47F 5/03 211/144 |
| 1,728,951 | A | * | 9/1929 | Appel | A01G 31/02 47/14 |
| 5,515,648 | A | * | 5/1996 | Sparkes | A01G 7/045 47/DIG. 6 |
| 6,604,321 | B2 | * | 8/2003 | Marchildon | A01G 31/047 47/62 R |
| 6,840,007 | B2 | * | 1/2005 | Leduc | A01G 31/02 47/79 |
| 7,188,451 | B2 | * | 3/2007 | Marchildon | A01G 31/047 47/62 R |

(Continued)

FOREIGN PATENT DOCUMENTS

| JP | 2007-502603 A | 2/2007 |
| KR | 20-0297898 Y1 | 12/2002 |

(Continued)

*Primary Examiner* — Monica L Barlow
(74) *Attorney, Agent, or Firm* — KORUS Patent, LLC; Seong Il Jeong

(57) ABSTRACT

The present invention relates generally to a rotary-type vegetable cultivation apparatus configured to grow various vegetables in cultivation containers fixed to a drum-shaped loop rotated by the driving of a motor and a cultivation container used in the rotary-type vegetable cultivation apparatus, and more particularly to a rotary vegetable cultivation apparatus and a cultivation container that enable the cultivation of a large quantity of edible vegetables in a narrow installation space and considerably facilitate the harvest and planting of vegetables.

10 Claims, 8 Drawing Sheets

(56) References Cited

U.S. PATENT DOCUMENTS

| | | | |
|---|---|---|---|
| 7,401,437 B2* | 7/2008 | Dumont | A01G 31/047 47/62 C |
| 7,730,663 B2* | 6/2010 | Souvlos | A01G 31/047 47/62 N |
| 9,743,597 B1* | 8/2017 | Thomas | A01G 31/047 |
| 10,292,346 B2* | 5/2019 | Gallant | A01G 31/047 |
| 10,299,442 B2* | 5/2019 | Vesty | A01G 31/047 |
| D905,125 S * | 12/2020 | Jo | A01G 9/26 D15/10 |
| 2004/0060491 A1* | 4/2004 | Leduc | A01G 31/047 111/105 |
| 2009/0165373 A1* | 7/2009 | Souvlos | A01G 31/047 47/79 |
| 2017/0099792 A1* | 4/2017 | Gallant | A01G 31/047 |
| 2019/0343056 A1* | 11/2019 | Brown | A01G 27/008 |

FOREIGN PATENT DOCUMENTS

| | | |
|---|---|---|
| KR | 20-0373832 Y1 | 1/2005 |
| KR | 10-0945472 B1 | 3/2010 |
| KR | 10-2012-0030677 A | 3/2012 |
| KR | 20-2013-0006595 U | 11/2013 |
| KR | 10-2017-0007979 A | 1/2017 |

\* cited by examiner

ROTARY VEGETABLE CULTIVATION APPARATUS

TECHNICAL FIELD

The present invention relates generally to a rotary-type vegetable cultivation apparatus configured to grow various vegetables in cultivation containers fixed to a drum-shaped loop rotated by the driving of a motor, and more particularly to a rotary vegetable cultivation apparatus and a cultivation container that enable the cultivation of a large quantity of edible vegetables in a narrow installation space and considerably facilitate the harvest and planting of vegetables.

BACKGROUND ART

Recently, interest in healthy food culture has been gradually increased, and vegetables are at the center thereof.

A conventional method of cultivating vegetables is to grow vegetables in a predetermined space limited to specific areas such as a vinyl greenhouse, a glass greenhouse, and an open field.

Accordingly, for the vegetables being grown in the designated area, a cultivation environment, such as temperature, light amount, moisture, and wind, is not uniform, so that uniform growth of vegetables cannot be achieved. Eventually, a problem arises in that the taste and freshness of the vegetables are not constant or bad.

Therefore, since uniform growth is not achieved, it is significantly difficult to grow vegetables in a specific size, so that a problem arises in that the marketability of the vegetables is significantly lowered. In terms of space utilization, since vegetables can be grown only on the surface of the cultivation area, space utilization is low and production is limited, so that a problem arises in that it is impossible to produce vegetables in quantity in a limited space.

Due to these problems, various vegetable cultivation apparatuses have been proposed to enable vegetables to be grown indoors in a form similar to that of a factory.

A "Drum-type Rotary Sprout Cultivation Apparatus" has been proposed in Korean Patent No. 10-0996543. This drum-type rotary sprout cultivation apparatus is problematic in that the apparatus requires an excessively large installation space because the apparatus is constructed in a relatively large structure, it is very difficult to transport and install the apparatus because the weight and volume of the cultivation device are large, and maintenance and repair expenses are high because the structure of the apparatus is complex.

Furthermore, the drum-type rotary sprout cultivation apparatus has a problem in that it is difficult to use the apparatus at home because the apparatus is constructed in a closed form.

DISCLOSURE

Technical Problem

The present invention has been conceived to overcome the above-described problems, and an object of the present invention is to provide a rotary-type vegetable cultivation apparatus in which the maintenance and repair thereof are easy because the structure thereof is simple, the transportation and storage thereof are considerably convenient because the vegetable cultivation apparatus is constructed in an assembly manner, and the mobile installation thereof is also considerably simple.

Another object of the present invention is to provide a cultivation container that considerably facilitates the harvest of a vegetable grown in a vegetable cultivation apparatus and the planting of a vegetable in the cultivation apparatus.

Technical Solution

In order to accomplish the above objects, there is provided a rotary vegetable cultivation apparatus including: a rotary supported on a shaft (105) by support spokes (112) and configured such that a pair of loop panels (111) are spaced apart by a predetermined interval and are rotatable around the shaft (105); a motor (102) configured to rotate the rotary; cultivation containers (120) radially fastened to the rotary by fastening means so that vegetables are directed to the center of the rotary; a light source (106) installed inside the rotary and configured to radiate light onto vegetables planted in the cultivation containers; and a frame (101) configured to support the shaft (105).

In this case, the rotary vegetable cultivation apparatus further includes a water supply tray (107) disposed below the rotary and configured to accommodate water and supply water to the cultivation containers (120) that are rotated along with the rotary.

Furthermore, inclined falling water plates (108) are formed on both sides of the water supply tray (107).

Furthermore, each of the loop panels (111) is configured by forming a plate having a predetermined thickness in a ring shape, and is formed such that the normal direction of the plate of the roof panel (111) is parallel to the direction of the shaft (105).

Furthermore, the roof panel (111) is divided into a predetermined number of parts, and is formed in a ring shape upon assembly.

Furthermore, the fastening means are configured such that holders (125) each formed in a circular shape in which a part of a cross-sectional shape is open and configured to be elastically deformable are formed on both sides of the top of each of the cultivation containers (120), and thus the cultivation container (120) is fastened and fixed in such a manner that fixing rods (113) disposed in the rotary and each formed to have a circular cross section are inserted inside the holders (125).

Furthermore, inclined sliders (126) are formed on the open portions of the holders (125) and thus guide the fixing rods (113) through insertion inside the holders (125).

Furthermore, each of the cultivation containers (120) is configured such that a space is formed therein and the top thereof is opened, and a cover (123) configured to close the inside of the cultivation container (120) by covering the open top of the cultivation container (120) is formed.

Furthermore, holding members (122) each having a slit into which an edge of the cover (123) is inserted are provided on both sides of the top of the cultivation container (120), and thus the cover (123) slides and is inserted and fastened into the slits of the holding members (122).

Furthermore, a hole (124) extending inward from an outside of the cover (123) is formed in the cover (123).

Moreover, rotaries are vertically installed on the frame (101) in multiple layers.

Advantageous Effects

In the vegetable cultivation apparatus of the present invention configured as described above, the plurality of cultivation containers is fastened onto the rotating rotary, and thus a large quantity of vegetables may be successively grown even in a narrow space.

Furthermore, when the cultivation container fastened to the vegetable cultivation apparatus is detached or attached, only the selected cultivation container may be easily detached or attached without the need to detach or attach another cultivation container.

DESCRIPTION OF REFERENCE SYMBOLS

Figure 1:
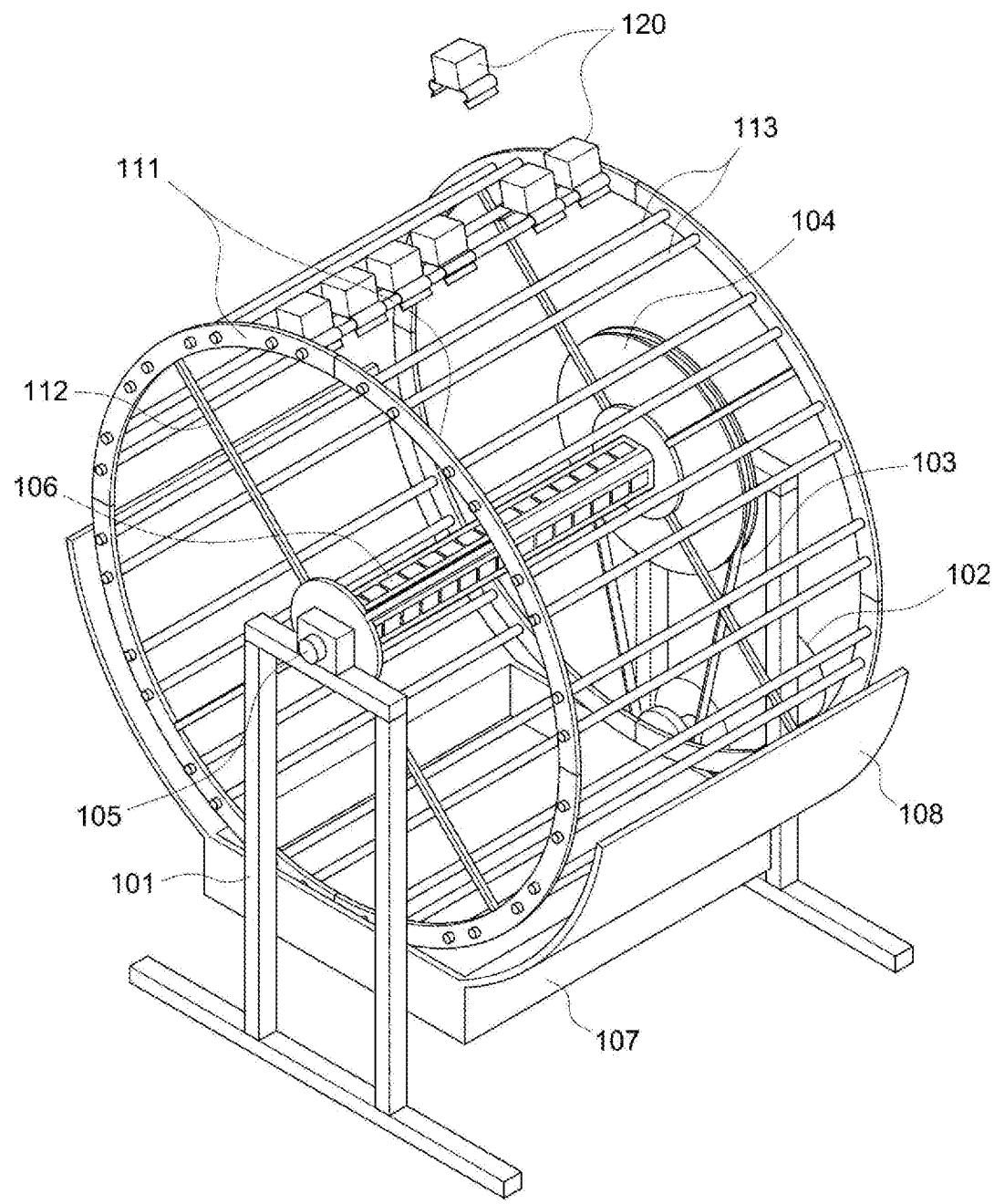
FIG. 1 is a perspective view showing a vegetable cultivation apparatus according to the present invention.

101: frame 102: motor
103: belt 104: wheel
105: shaft 106: light source
107: water supply tray 108: falling water plate
111: loop panel 112: support spoke
113: fixing rod 120: cultivation container
121: water passage hole 122: holding member
123: cover 124: hole
125: holder 126: slider

BEST MODE

The present invention will be described in detail below with reference to preferred embodiments of the present invention and the accompanying drawings, but it will be described on the assumption that the same reference symbols refer to the same components.

When any one component is described as "including" another component in the detailed description of the invention or the attached claims, it should be understood that the former component is not limited to including only the latter component but may further include another component, unless otherwise stated.

Figure 2:
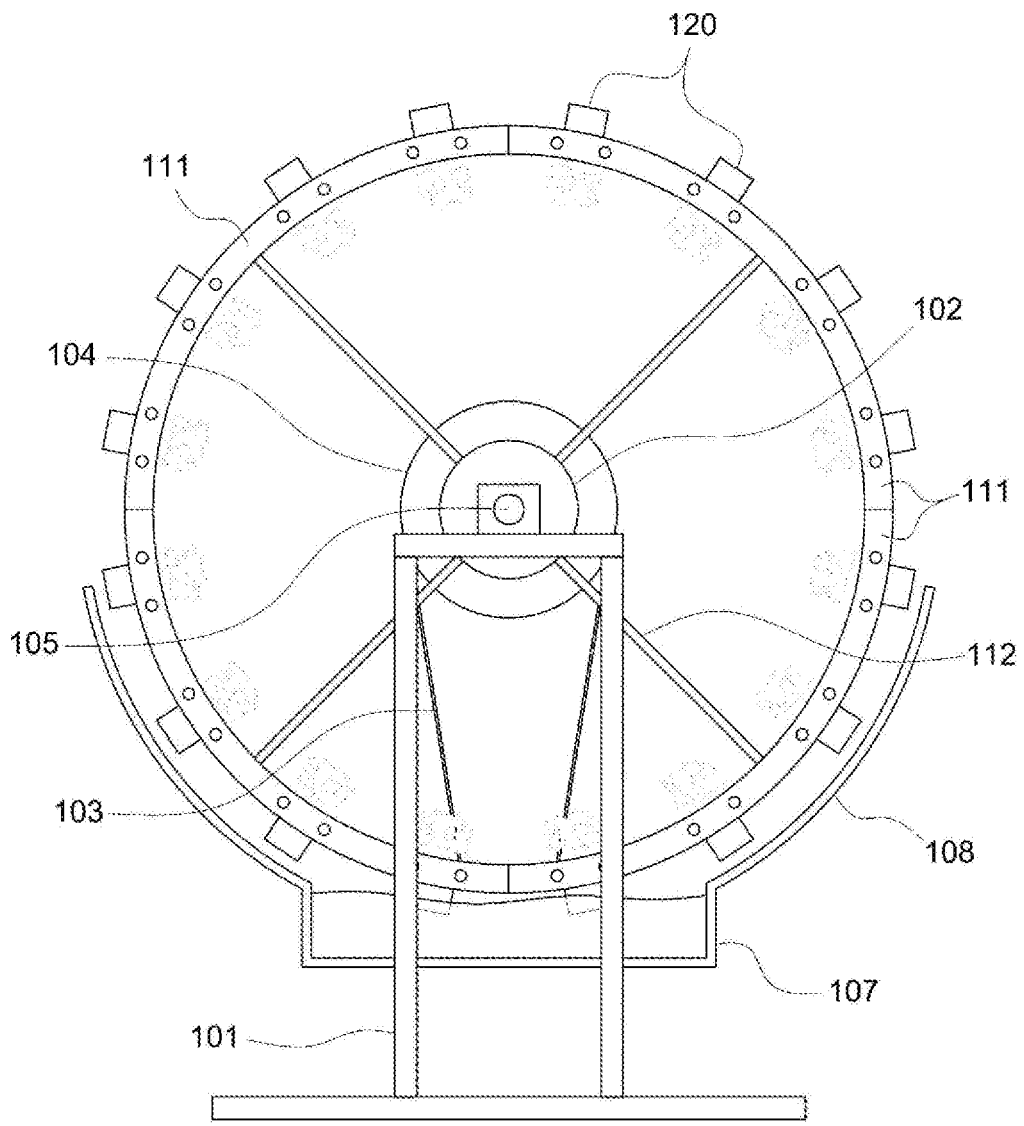
FIG. 2 is a front view showing the vegetable cultivation apparatus according to the present invention.
Figure 3:
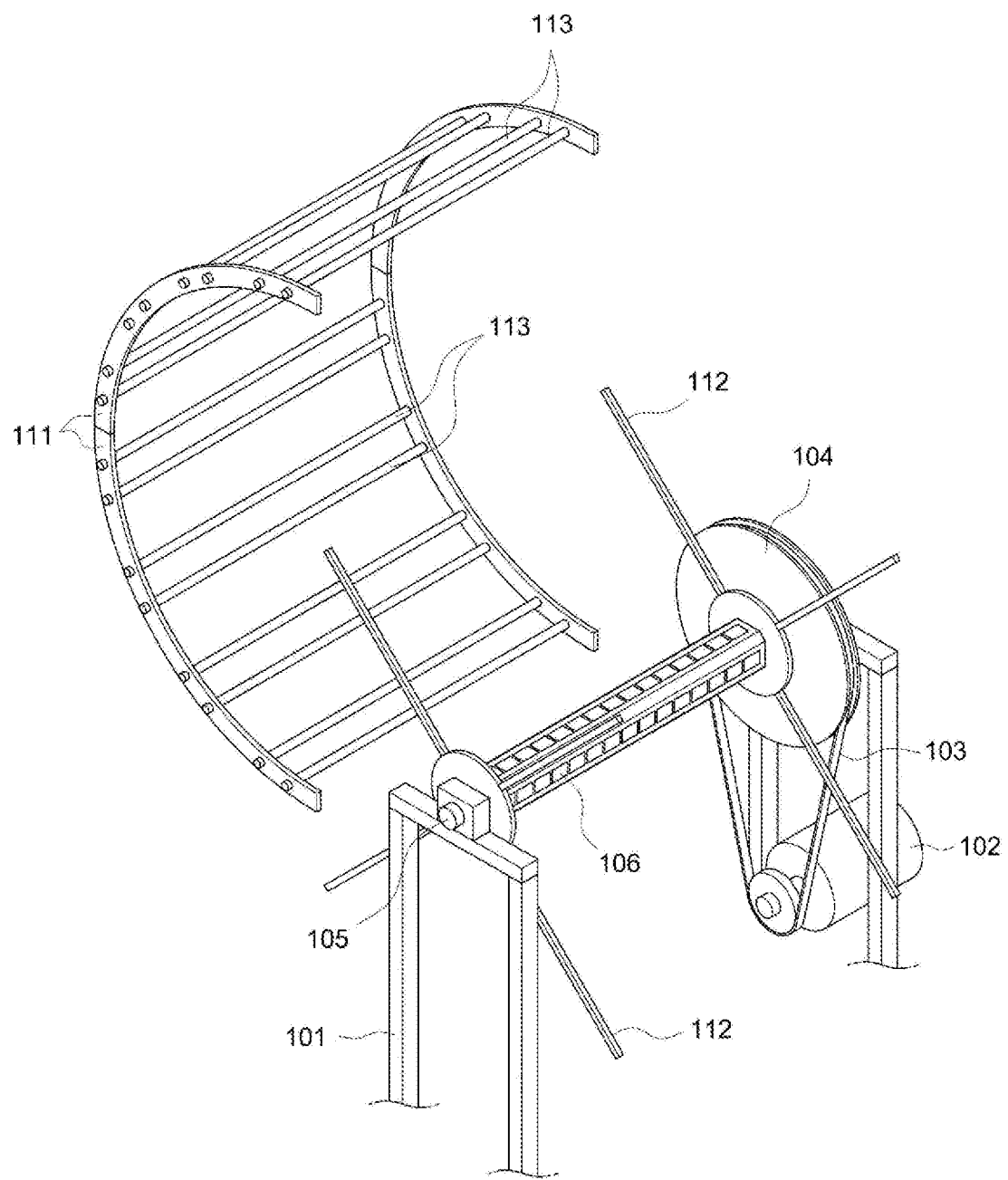
FIG. 3 is an exploded perspective view showing important components of the vegetable cultivation apparatus according to the present invention.

As shown in FIGS. 1 to 3, a rotary vegetable cultivation apparatus according to the present invention includes a rotary configured to be rotated by the driving of a motor 102, cultivation containers 120 mounted on the rotating rotary and configured such that vegetables are planted and grown therein, a light source 106 configured to radiate light onto vegetables planted in the cultivation containers 120, a water supply tray 107 configured to supply water to the cultivation containers 120 fastened to the rotary and configured to be rotated, and a frame 101 configured to support the rotary.

As shown in FIGS. 1 to 3, the rotary is configured such that roof panels 111 formed in a pair of rings are spaced apart by a predetermined distance (by the length of fixing rods 113) through the fixing rods 113.

Although each of the ring-shaped roof panels 111 may be fabricated and installed in a ring shape, it is preferable that the ring-shaped roof panel 111 is configured to have a minimum volume when stored and distributed by dividing it into a predetermined number of parts, as shown in FIG. 3.

The ring-shaped roof panel 111 is formed by fastening the roof panel 111 divided by a predetermined number of parts as described above, and the pair of ring-shaped roof panels 111 are connected with a predetermined number of fixing rods 113.

Furthermore, the loop panels 111 and a shaft 105 are fastened to each other with a predetermined number of support spokes 112 so that the loop panels 111 can be rotated about the shaft 105.

In this case, although the loop panel 111 may be formed using a pipe having a circular or square cross-sectional shape, it is preferable that the loop panel 111 is composed of a thin plate having a predetermined thickness, as shown in FIGS. 1 and 3, thereby reducing the weight thereof.

Furthermore, the loop panel 111 is formed using a plate having a predetermined thickness as described above. However, it is preferable that the loop panel 111 is formed such that the normal direction of the plate of the roof panel 111 is parallel to the direction of the shaft 105, as shown in FIGS. 1 and 3.

If the loop panel 111 is formed such that the normal direction of the loop panel 111 is perpendicular to the shaft 105, the loop panel 111 is easily bent by the loop panel 111's own load, the load of the fixing rods 113, and the load of the cultivation containers 120. In order to prevent this, a plurality of support spokes 112 needs to be installed closely.

In contrast, if the loop panel 111 is vertically formed such that the normal direction of the loop panel 111 is parallel to the shaft 105 as shown in FIGS. 1 and 3, it is not easily bent against the load, and thus an effect arises in that a smaller number of support spokes 112 may be required.

The light source 106 that radiates light in response to the supply of power is installed on the shaft 105 of the rotary that is configured as described above.

As the light source 106, fluorescent lamps, halogen lamps, and incandescent lamps have low light utilization efficiency because they contain light in the wavelength range that is unnecessary for the growth of plants, have low production efficiency because the space occupied by the light source is large, and incur large expenses for air conditioning equipment because the radiation of heat is severe. Accordingly, it is preferable to install LEDs having the advantages of short wavelength characteristics, low power consumption, and long life as the light source 106.

Furthermore, the shaft 105 is supported by the frame 101 and is installed to be spaced apart from the ground by a predetermined distance. The shaft of the motor 102 and the shaft 105 of the rotary are connected by a belt 103, and the rotary is configured to be rotated by the driving of the motor 102.

As shown in FIGS. 1 and 2, the pair of loop panels 111 are fastened to both side ends of the plurality of fixing rods 113. The cultivation containers 120 in which vegetables are planted and grown are fastened and fixed to the fixing rods 113.

Figure 4:
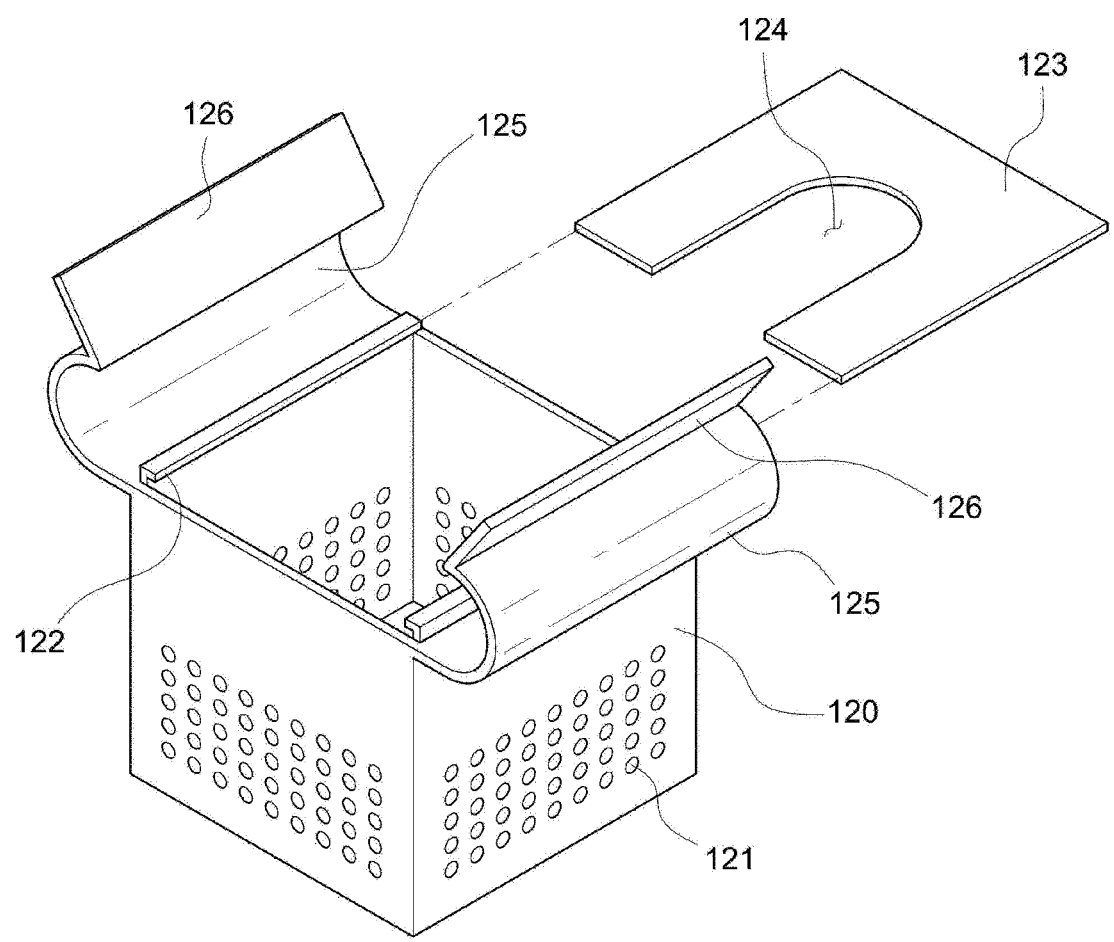
FIG. 4 is a perspective view showing a cultivation container according to the present invention.

As shown in FIG. 4, each of the cultivation containers 120 is formed to have a space therein with the top thereof open, semicircle-shaped holders 125 are formed on two opposite sides the top of the cultivation container 120 so that the open portions thereof face each other, and sliders 126 inclined to the outside are formed on the tops of the respective holders 125.

Figure 5:
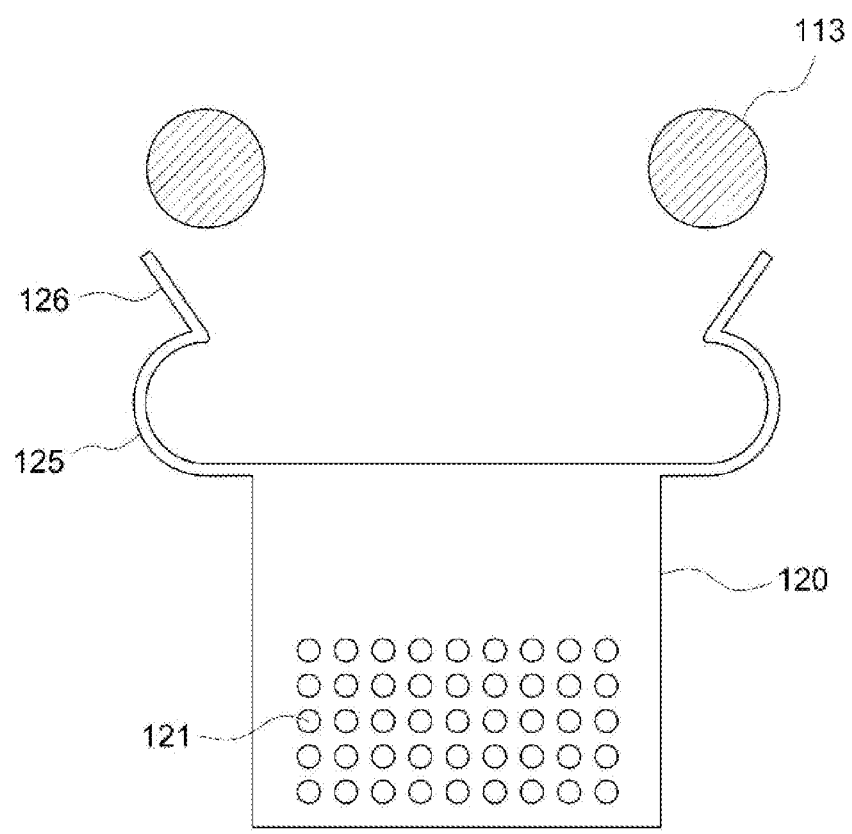
FIGS. 5 to 7 are diagrams sequentially showing a process in that the cultivation container of the cultivation apparatus is fastened.
Figure 6:
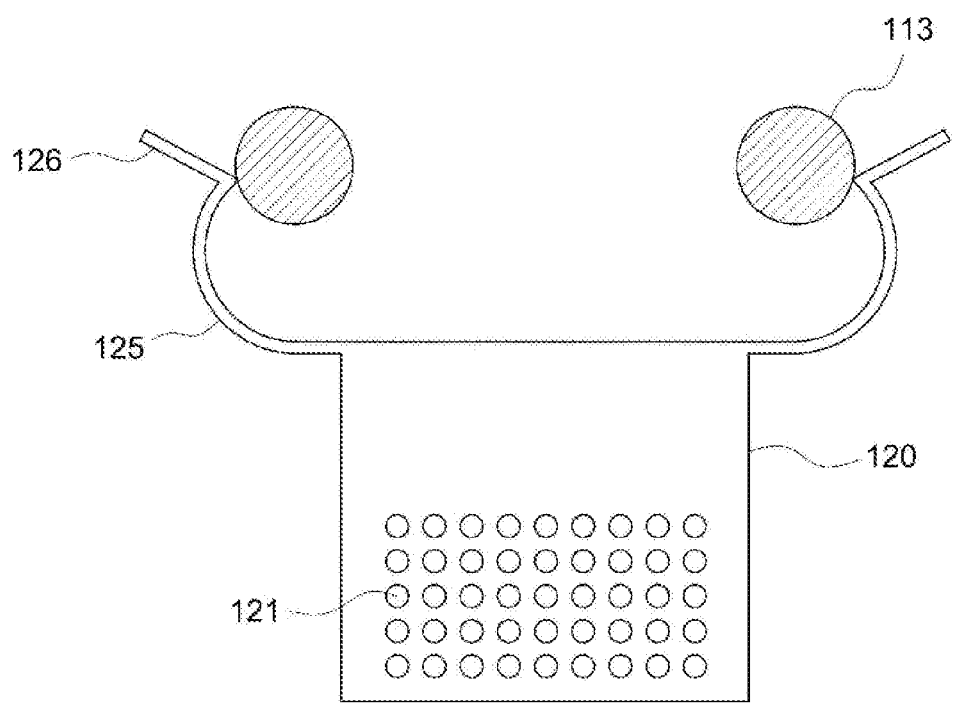
Figure 7:
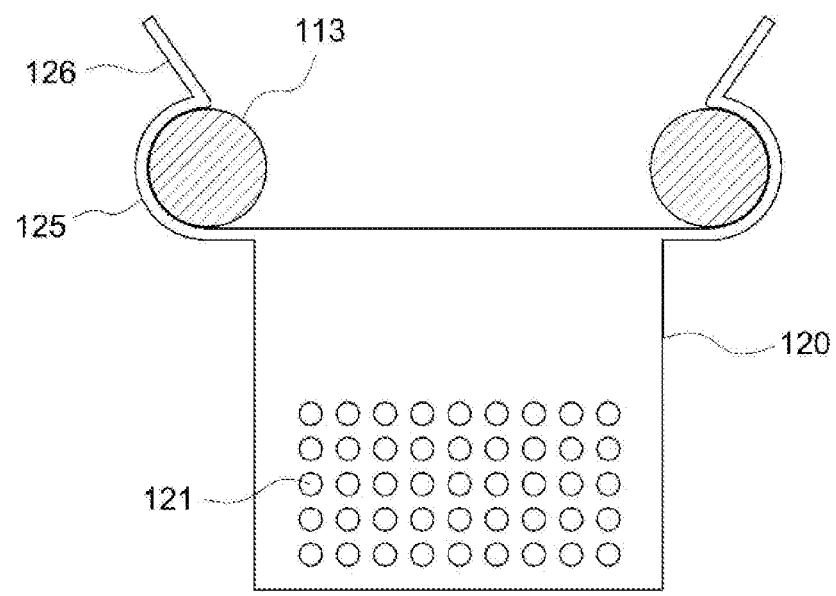

The cultivation container 120 configured as described above is fastened to the fixing rods 113 of the rotary and is rotated along with the rotary. The cultivation container 120 is fastened to the fixing rods 113 of the rotary in the following process:

The fixed rods 113 of the rotary are configured to be spaced apart by a distance similar to the distance between the holders 125 of the cultivation container 120. When the open top of the cultivation tank 120 is brought into close contact with the fixing rods 113 as shown in FIG. 5, the pair of fixing rods 113 come into contact with the surfaces of the respective sliders 126 of the cultivation tank 120. In this state, when the cultivation container 120 is pressed, the sliders 126 slide along the fixing rods 113 and the holders 125 are elastically deformed to the outside and opened, as shown in FIG. 6. When the cultivation container 120 continues to be pressed, the elastically deformed holders 125 are elastically restored and the fixing rods 113 are inserted inside the holders 125, as shown in FIG. 7, so that the cultivation container 120 is fastened and fixed onto the fixing rods 113 of the rotary.

The cultivation canister 120 is injection-molded by using synthetic resin as a material. In general, since the synthetic resin material is elastically deformed, the cultivation canister 120 is fastened and fixed onto the fixing rods 113 by the elastic deformation and elastic restoration of the holders 125, as described above.

When the inner diameter of the semicircular holders 125 is formed to be the same as the outer diameter of the fixing rods 113, the cultivation container 120 is further securely fastened and fixed when the holders 125 of the cultivation container 120 are fastened onto the fixing rods 113.

When power is applied to the motor 102 and the motor 102 is driven in a state in which the cultivation containers 120 are successively installed onto the fixed rods 113 of the rotary as described above, the cultivation containers 120 radially installed on the rotary are rotated while the rotary is rotated, and thus vegetables planted in the cultivation containers are grown.

If the rotary is not rotated, vegetables grow obliquely in the cultivation containers 120 fastened onto the top or side of the rotary and are grown in a deformed form, and thus the marketability thereof are deteriorated. Accordingly, the rotary is rotated at a constant speed so that vegetables grow straight.

In addition, the water supply tray 107 is installed below the rotary, as shown in FIGS. 1 and 2. Accordingly, as the rotary is rotated, the cultivation containers 120 fastened to the fixing rods 113 of the rotary are partially immersed in the water supply tray 107, and thus water and nutrients are supplied to the vegetables planted in the cultivation containers 120.

For this purpose, it is preferable that water passage holes 121 are formed in the cultivation containers 120, as shown in FIG. 4, so that water can be smoothly supplied into the cultivation containers 120.

In this case, it is preferable that inclined falling water plates 108 are installed on both sides of the water supply tray 107, as shown in FIG. 2, so that the inclined falling water plates 108 receive water falling when the cultivation container immersed in the water supply tray 107 and supplied with moisture is raised along with the rotary and resupply the water to the water supply tray 107.

As described above, the cultivation containers 120 are radially fastened to the rotary so that the cultivation containers 120 are rotated along the rotary. When the cultivation container 120 is located at the top, i.e., when the cultivation container 120 is in an upside-down position, the soil inside the cultivation container 120 or a vegetable being grown may fall.

To prevent this, the cover 123 is coupled to the open top of the cultivation container 120, as shown in FIG. 4. Accordingly, even when the cultivation container 120 is turned over, the soil in the cultivation container 120 or the vegetable being grown is prevented from falling.

As shown in FIG. 4, holding members 122 having an "L"-shaped cross section are formed on two opposite sides of the open top of the cultivation container 120, and a plate-shaped cover 123 slides and is inserted and fastened into the holding members 122.

In this case, a hole 124 extending inward from the outside of the cover is formed in the cover 123. When a vegetable is planted in the cultivation container 120 and then the cover 123 is fastened, or when the cover 123 is opened in a state in which a vegetable has been grown, the stem portion of the vegetable passes through the hole 124 of the cover 123. Accordingly, even when a vegetable is planted in the cultivation container 120, the cover 123 may be opened or closed.

In the vegetable cultivation apparatus of the present invention configured as described above, the plurality of cultivation containers is fastened to the rotating rotary and then vegetables are grown, so that a large quantity of vegetables may be successively grown even in a narrow space.

Figure 8:
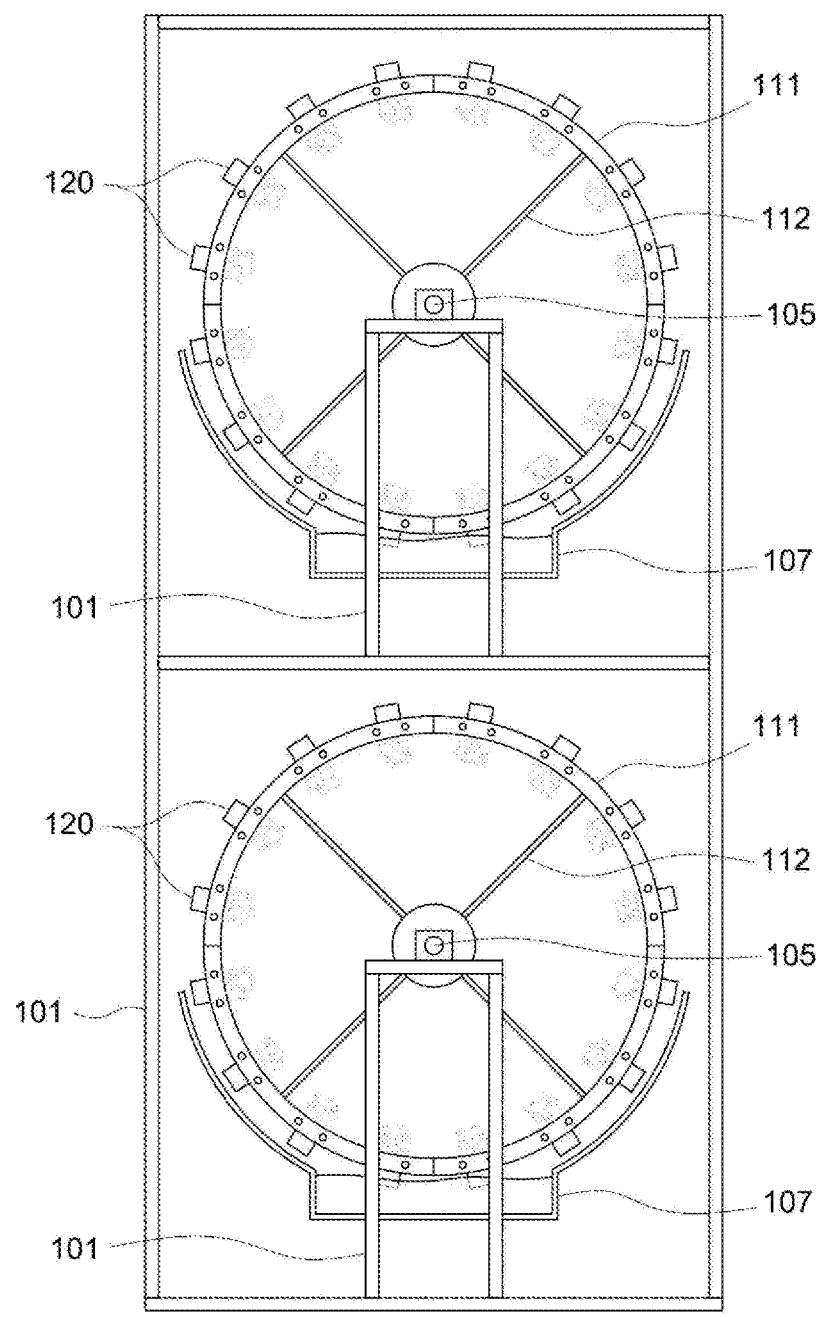
FIG. 8 is a diagram showing a state in which the cultivation apparatuses of the present invention are stacked on each other.

In particular, as shown in FIG. 8, frames 101 are vertically disposed in multiple layers and rotaries are stacked on each other, so that more vegetables can be grown and harvested in the same space.

According to the present invention configured as described above, the maintenance and repair thereof are easy because the structure thereof is simple, the transportation and storage thereof are considerably convenient because the rotary, which occupies the largest part of the volume thereof, is constructed in an assembly manner, and the mobile installation thereof is also considerably simple.

In addition, in the case where vegetables grown in the vegetable cultivation apparatus are harvested, when one of the cultivation containers installed in series is selectively removed, only the selected cultivation container may be easily removed or attached without a need to remove another cultivation container.

The technical spirit of the present invention has been discussed through the above-described embodiments.

It will be apparent that a person having ordinary skill in the art to which the present invention pertains may modify or alter the above-described embodiments in various manners based on the description of the present invention.

Furthermore, even if not explicitly shown or described, a person having ordinary skill in the art to which the present invention pertains may make various modifications within the technical spirit of the present invention based on the description of the present invention. These modifications still fall within the scope of the present invention.

The above embodiments described with reference to the accompanying drawings have been described for the purpose of describing the present invention, and the scope of the present invention is not limited to these embodiments.

The invention claimed is:
1. A rotary vegetable cultivation apparatus comprising:
   a rotary supported on a shaft (105) by support spokes (112) and configured such that a pair of loop panels (111) are spaced apart by a predetermined interval and are rotatable around the shaft (105);

a motor (102) configured to rotate the rotary;
cultivation containers (120) radially fastened to the rotary by fastening means so that vegetables are directed to a center of the rotary;
a light source (106) installed inside the rotary and configured to radiate light onto vegetables planted in the cultivation containers;
a frame (101) configured to support the shaft (105); and
wherein the fastening means are configured such that holders (125) each formed in a circular shape in which a part of a cross-sectional shape is open and configured to be elastically deformable are formed on both sides of a top of each of the cultivation containers (120), and thus' the cultivation container (120) is fastened and fixed in such a manner that fixing rods (113) disposed in the rotary and each formed to have a circular cross section are inserted inside the holders (125).

2. The rotary vegetable cultivation apparatus of claim 1, further comprising a water supply tray (107) disposed below the rotary and configured to accommodate water and supply water to the cultivation containers (120) that are rotated along with the rotary.

3. The rotary vegetable cultivation apparatus of claim 2, wherein inclined falling water plates (108) are formed on both sides of the water supply tray (107).

4. The rotary vegetable cultivation apparatus of claim 1, wherein each of the loop panels (111) is configured by forming a plate having a predetermined thickness in a ring shape, and is formed such that a normal direction of the plate of the roof panel (111) is parallel to a direction of the shaft (105).

5. The rotary vegetable cultivation apparatus of claim 4, wherein the roof panel (111) is divided into a predetermined number of parts, and is formed in a ring shape upon assembly.

6. The rotary vegetable cultivation apparatus of claim 1, wherein inclined sliders (126) are formed on open portions of the holders (125) and thus guide the fixing rods (113) through insertion inside the holders (125).

7. The rotary vegetable cultivation apparatus of claim 1, wherein each of the cultivation containers (120) is configured such that a space is formed therein and a top thereof is opened, and a cover (123) configured to close an inside of the cultivation container (120) by covering the open top of the cultivation container (120) is formed.

8. The rotary vegetable cultivation apparatus of claim 7, wherein holding members (122) each having a slit into which an edge of the cover (123) is inserted are provided on both sides of a top of the cultivation container (120), and thus the cover (123) slides and is inserted and fastened into the slits of the holding members (122).

9. The rotary vegetable cultivation apparatus of claim 8, wherein a hole (124) extending inward from an outside of the cover (123) is formed in the cover (123).

10. The rotary vegetable cultivation apparatus of claim 1, wherein rotaries are vertically installed on the frame (101) in multiple layers.

* * * * *